United States Patent
Wang et al.

(10) Patent No.: US 10,510,278 B2
(45) Date of Patent: Dec. 17, 2019

(54) SIGNAL LOADING METHOD AND SIGNAL GENERATOR

(71) Applicants: BOE TECHNOLOGY GROUP CO., LTD., Beijing (CN); ORDOS YUANSHENG OPTOELECTRONICS CO., LTD., Ordos, Inner Mongolia (CN)

(72) Inventors: Weifeng Wang, Beijing (CN); Guoqing Zhang, Beijing (CN); Hongxia Yang, Beijing (CN); Yu Fu, Beijing (CN); Xingliang Wang, Beijing (CN); Zhixin Guo, Beijing (CN); Yanbin Dang, Beijing (CN); Xiaowei Wang, Beijing (CN); Jie Wu, Beijing (CN); Feiwen Tian, Beijing (CN); Pucha Zhao, Beijing (CN); Chenwei Wang, Beijing (CN); Xuepeng Ji, Beijing (CN)

(73) Assignees: BOE TECHNOLOGY GROUP CO., LTD., Beijing (CN); ORDOS YUANSHENG OPTOELECTRONICS CO., LTD., Ordos, Inner Mongolia (CN)

( * ) Notice: Subject to any disclaimer, the term of this patent is extended or adjusted under 35 U.S.C. 154(b) by 0 days.

(21) Appl. No.: 16/213,210

(22) Filed: Dec. 7, 2018

(65) Prior Publication Data
US 2019/0180662 A1    Jun. 13, 2019

(30) Foreign Application Priority Data

Dec. 8, 2017 (CN) .......................... 2017 1 1293784

(51) Int. Cl.
*G09G 3/00* (2006.01)
*H02H 3/20* (2006.01)

(52) U.S. Cl.
CPC ............... *G09G 3/006* (2013.01); *H02H 3/20* (2013.01)

(58) Field of Classification Search
None
See application file for complete search history.

(56) References Cited

U.S. PATENT DOCUMENTS

| 2002/0158609 A1* | 10/2002 | Lavington | H02J 7/0029 320/165 |
| 2014/0152180 A1* | 6/2014 | Wolf | H05B 33/0884 315/122 |
| 2016/0125776 A1* | 5/2016 | Zhang | G09G 3/006 324/754.08 |

* cited by examiner

*Primary Examiner* — Jany Richardson
(74) *Attorney, Agent, or Firm* — Nath, Goldberg & Meyer; Joshua B. Goldberg

(57) ABSTRACT

The present disclosure provides a signal loading method and a signal generator. The signal loading method includes: loading a first pair of voltage signals to at least one pair of separate signal channels for a time period, respectively, wherein the first pair of voltage signals have a first voltage difference therebetween; and determining whether a short circuit occurs in the at least one pair of signal channels within the time period, and if it is determined that no short circuit occurs in the at least one pair of signal channels within the time period, loading a second pair of voltage signals having a second voltage difference therebetween to the at least one pair of signal channels at the end of the time period. The second voltage difference is greater than the first voltage difference.

13 Claims, 1 Drawing Sheet

SIGNAL LOADING METHOD AND SIGNAL GENERATOR

CROSS-REFERENCE TO RELATED APPLICATION

This application claims the benefit of priority to Chinese Patent Application No. 201711293784.1 filed on Dec. 8, 2017, the contents of which are incorporated herein in their entirety by reference.

TECHNICAL FIELD

The present disclosure relates to the field of display technology, and in particular, to a signal loading method and a signal generator.

BACKGROUND

When an Organic Light Emitting Diode (OLED) panel is subjected to an aging test in a testing phase, one signal generator can be used to perform the aging test on 8 to 10 panels at the same time. In this case, it is often necessary to load a voltage signal with a large magnitude such as VGL, VGH, VINIT, VDD, VSS, VREF, or the like.

SUMMARY

In one aspect, the present disclosure provides a signal loading method, including:
  loading a first pair of voltage signals to at least one pair of separate signal channels for a time period, respectively, wherein the first pair of voltage signals have a first voltage difference therebetween; and
  determining whether a short circuit occurs in the at least one pair of signal channels within the time period, and if it is determined that no short circuit occurs in the at least one pair of signal channels within the time period, loading a second pair of voltage signals to the at least one pair of signal channels at the end of the time period, wherein the second pair of voltage signals have a second voltage difference therebetween and the second voltage difference is greater than the first voltage difference.

Optionally, the signal loading method further includes: once it is determined that a short circuit occurs in the at least one pair of signal channels within the time period, stopping loading the first pair of voltage signals to the at least one pair of signal channels, without loading the second pair of voltage signals to the at least one pair of signal channels thereafter.

Optionally, the first voltage difference ranges from 8 to 10 volts.

Optionally, a length of the time period ranges from 300 to 500 nanoseconds.

Optionally, the second voltage difference ranges from 15 to 20 volts.

Optionally, the at least one pair of separate signal channels include two separate conductive electrodes.

Optionally, loading the first pair of voltage signals to the at least one pair of separate signal channels for the time period respectively includes loading the first pair of voltage signals to at least one pair of separate signal channels on a display panel for the time period respectively.

Optionally, loading the first pair of voltage signals to the at least one pair of separate signal channels on the display panel for the time period respectively includes: simultaneously loading the first pair of voltage signals to the at least one pair of separate signal channels on each of a plurality of display panels for the time period.

The present disclosure also provides a signal generator including a controller and a signal generating circuit. The signal generating circuit includes at least one pair of output terminals configured to output at least one pair of voltage signals. The controller is configured to: control the signal generating circuit to output at least one first pair of voltage signals for a time period, wherein a voltage difference between the first pair of voltage signals is a first voltage difference; and the controller is further configured to control, in a case that no control instruction is received before the end of the time period, the signal generating circuit to output at least one second pair of voltage signals, wherein a voltage difference between the second pair of voltage signals is a second voltage difference, and the second voltage difference is greater than the first voltage difference.

Optionally, the controller is further configured to, upon receipt of the control instruction within the time period, stop outputting the at least one first pair of voltage signals, and control the signal generating circuit not to output the second pair of voltage signals thereafter.

Optionally, the signal generator further includes a protection circuit located at the at least one pair of output terminals of the signal generating circuit and configured to protect the signal generating circuit from being damaged by a reverse current.

Optionally, the protection circuit is an overcurrent protection chip.

Optionally, the protection circuit is disposed on a main board of the signal generator.

Optionally, the control instruction indicates that a short circuit occurs in the signal channels to which the first pair of voltage signals are loaded within the time period.

Optionally, the signal generating circuit includes a plurality of pairs of output terminals, the signal generator includes a plurality of protection circuits, and the plurality of protection circuits are in one-to-one correspondence with the plurality of pairs of output terminals.

DETAILED DESCRIPTION

The technical solutions in the present disclosure will be clearly and completely described in conjunction with the drawings in the present disclosure. Apparently, the embodiments described herein are a part of, rather than all of, the embodiments of the present disclosure. All other embodiments obtained by a person of ordinary skill in the art based on the embodiments of the present disclosure without any creative effort are within the scope of the present disclosure.

The inventors found that in the panel bonding area, due to abnormalities in the process, particles may remain, resulting in a short circuit between adjacent signal channels. Due to the short circuit, a large current instantaneously causes a high temperature of 200° C. or higher, thereby burning the power supply main board of the signal generator, making the output voltage of the signal generator abnormal, and causing the panel to be abnormally lit. Moreover, the high temperature also causes the material at a corner position of the display area near the binding area to be burned, thus, not only the material is black, resulting in a poor appearance of the panel, but also the organic light emitting material at the position cannot emit light normally, affecting the display effect. In addition, for a flexible display panel, the high heat generated after the short circuit also causes a film of the flexible panel to curl, reducing the yield of the product.

Accordingly, the present disclosure, inter alia, provides a signal loading method and signal generator that substantially obviate one or more of the problems due to limitations and disadvantages of the related art.

Figure 1:
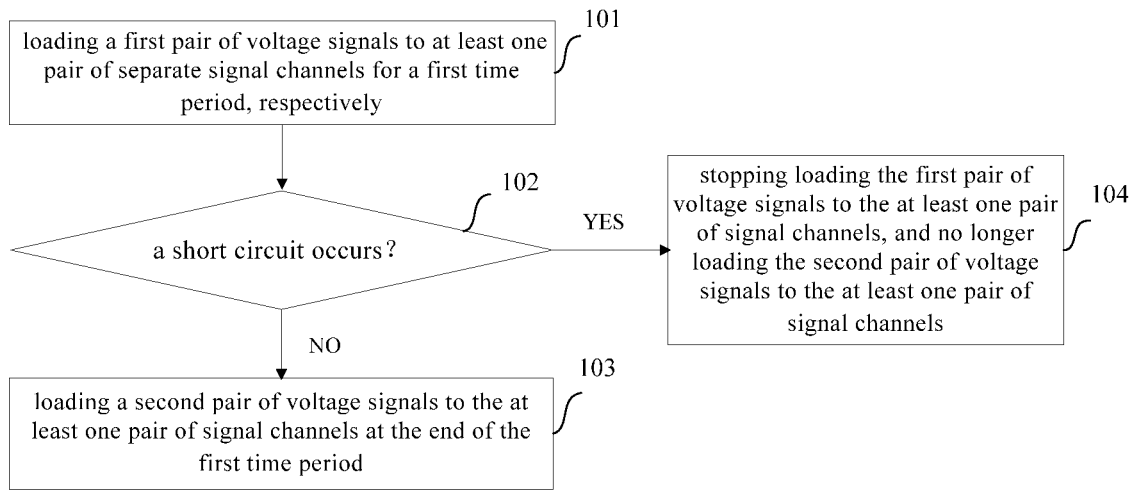
FIG. 1 is a schematic flowchart of a signal loading method according to an embodiment of the present disclosure.

The present disclosure provides a signal loading method, as shown in FIG. 1, including steps 101 to 104.

Step 101 includes: loading a first pair of voltage signals to at least one pair of separate signal channels for a first time period, respectively, wherein the first pair of voltage signals have a first voltage difference therebetween.

In some embodiments, the signal loading method can be used to detect the service life of the display panel (i.e., the aging test) during the testing phase of the display panel. For example, a signal generator may be used to apply a voltage to the display panel to be tested to detect the service life of the display panel to be tested. Specifically, at least one pair of output terminals of the signal generator are connected to at least one pair of separate signal channels of the display panel to be tested. Optionally, the at least one pair of separate signal channels include at least one pair of adjacent conductive electrodes. Optionally, the conductive electrodes may be conductive electrodes in a binding area of the display panel to be tested. By taking the signal generator including one pair of output terminals as an example, one output terminal of the pair of output terminals is electrically connected to one of the conductive electrodes, and the other output terminal thereof is electrically connected to another one of the conductive electrodes adjacent to the one of the conductive electrodes. The pair of output terminals of the signal generator are controlled to output a first pair of voltage signals, and a voltage difference between the first pair of voltage signals is a first voltage difference, that is, a voltage difference between voltage signals outputted from the two output terminals is a first voltage difference.

Optionally, the first voltage difference ranges from 8 to 10 volts. The first time period ranges from 300 to 500 nanoseconds.

Step 102 includes: determining whether a short circuit occurs in the at least one pair of signal channels within the first time period. If it is determined that no short circuit occurs in the at least one pair of signal channels within the first time period, step 103 is performed; otherwise, step 104 is performed.

For example, in the process of loading the first pair of voltage signals, it is detected whether a pair of adjacent conductive electrodes loaded with the first pair of voltage signals is short-circuited; if no short circuit occurs, the signal generator loads a second pair of voltage signals to the conductive electrodes at the end of the first time period (i.e., step 103 is performed), a voltage difference between the second pair of voltage signals is a second voltage difference, and the second voltage difference is greater than the first voltage difference.

If a short circuit occurs, since the voltage difference between the first pair of voltage signals is smaller than the voltage difference between the second pair of voltage signals, it indicates that loading a pair of voltage signals with a smaller voltage difference has short-circuited the pair of adjacent conductive electrodes, so there is no need to perform the test by loading a pair of voltage signals with a larger voltage difference. Therefore, the loading of the first pair of voltage signals is stopped, and the second pair of voltage signals will not be loaded onto the conductive electrodes (i.e., step 104 is performed), thereby terminating the test.

Step 103 includes: loading a second pair of voltage signals having a second voltage difference therebetween to the at least one pair of signal channels at the end of the first time period, wherein the second voltage difference is greater than the first voltage difference.

Whether or not the conductive electrodes loaded with the first pair of voltage signals have been short-circuited may be determined by a detection device or manually determined by a tester. For example, if it is determined by the detection device that the conductive electrodes are not short-circuited, the detection device does not send a control instruction to the signal generator, and the signal generator automatically loads the second pair of voltage signals onto the conductive electrodes at the end of the first time period, the voltage difference between the second pair of voltage signals (i.e., the second voltage difference) being greater than the first voltage difference.

Optionally, a second time period may be preset in the signal generator, and the signal generator may start the second time period at the end of the first time period. During the second time period, for example, the tester may determine whether the conductive electrodes are short-circuited. If no short circuit occurs, the tester does not send a control instruction to the signal generator, and then the signal generator automatically applies the second pair of voltage signals to the conductive electrodes at the end of the second time period, and the voltage difference between the second pair of voltage signals (i.e., the second voltage difference) is greater than the first voltage difference.

Optionally, the second voltage difference between the second pair of voltage signals may range from 15 to 20 volts.

Step 104 includes: stopping loading the first pair of voltage signals to the at least one pair of signal channels, and no longer loading the second pair of voltage signals to the at least one pair of signal channels.

Whether it is determined by the detection device or the tester whether a short circuit occurs, if it is determined that a short circuit occurs during the loading of the first pair of voltage signals, the detection device or the tester issues a control instruction to the signal generator to control the signal generator to stop loading the first pair of voltage signals and no longer continue to load the second pair of voltage signals. At this point, the test on the display panel ends and the display panel fail to pass the test.

In the signal loading method of the embodiment of the present disclosure, the voltage signals are loaded on a stage basis, that is, a lower voltage is first loaded, and in this process, it is detected whether the signal channels loaded with the voltage (for example, at least one pair of adjacent conductive electrodes of the display panel) are short-circuited; if no short circuit occurs, a higher voltage is applied. Therefore, the signal generator and the display panel to be tested can be avoided from being burned due to the short circuit, which can not only provide real-time protection for the display panel, and improve product yield and display effect, but also improve reliability and safety of the signal generator, and increase the service life of the signal generator.

It should be noted that the signal loading method of the present disclosure can also be used for testing multiple display panels at the same time. According to an embodiment of the present disclosure, respectively loading the first pair of voltage signals to at least one pair of separate signal channels for the first time period (i.e., step 101) includes simultaneously loading the first pair of voltage signals to the at least one pair of separate signal channels on each of a plurality of display panels for the first time period. In this way, the efficiency of the test on the display panel can be improved.

Figure 2:
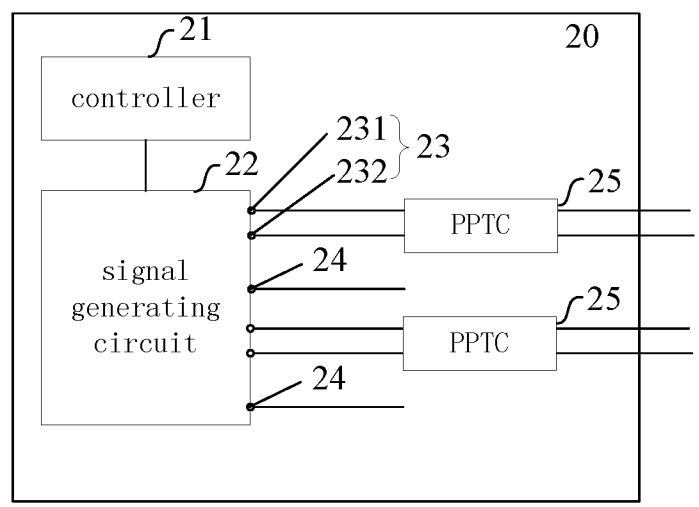
FIG. 2 is a block diagram of a signal generator according to an embodiment of the disclosure.

The present disclosure also provides a signal generator, as shown in FIG. 2, which includes a controller 21 and a signal generating circuit 22. The signal generating circuit 22 includes at least one pair of output terminals 23 configured to output at least one pair of voltage signals. In the embodiment of the present disclosure, by taking the case that the signal generator includes one pair of output terminals 23 as an example, as shown in FIG. 2, the pair of output terminals 23 includes a first output terminal 231 and a second output terminal 232, and the first output terminal 231 and the second output terminal 232 can output voltage signals at different levels.

The controller 21 is configured to control the signal generating circuit 22 to output at least one first pair of voltage signals for a preset first time period, wherein the voltage difference between the first pair of voltage signals is the first voltage difference. It is determined by a tester or a detection device whether or not at least one pair of adjacent conductive electrodes of the display panel loaded with the first pair of voltage signals are short-circuited. The controller 21 is further configured to control, when no control instruction is received before the first time period ends, the signal generating circuit 22 to output at least one second pair of voltage signals, wherein a voltage difference between the second pair of voltage signals is a second voltage difference, and the second voltage difference is greater than the first voltage difference.

In some embodiments, the control instruction is sent to the controller 21 when a short circuit occurs in one pair of signal channels loaded with the first pair of voltage signals. The control instruction may be sent by a detection device for detecting a short circuit, or may be sent by a tester.

Optionally, the first voltage difference ranges from 8 to 10 volts.

Optionally, a length of the first time period ranges from 300 to 500 nanoseconds.

The signal generator according to the embodiment of the present disclosure loads the voltage signals on a stage basis. Specifically, a smaller voltage is first loaded, and in this process, it is detected whether the signal channels loaded with the voltage (for example, at least one pair of adjacent conductive electrodes of the display panel) are short-circuited; if no short circuit occurs, a larger voltage is applied. Therefore, the signal generator and the display panel to be tested can be avoided from being burned due to the short circuit, which can not only provide real-time protection for the display panel, and improve product yield and display effect, but also improve reliability and safety of the signal generator, and increase the service life of the signal generator.

Optionally, the controller 21 is further configured to stop outputting the at least one first pair of voltage signals, and control the signal generating circuit 22 not to output the second pair of voltage signals, if the control instruction is received within the first time period.

Optionally, as shown in FIG. 2, the signal generator further includes an input terminal 24 configured to receive a feedback signal from the input terminal 24. The feedback signal is sent by at least one pair of adjacent conductive electrodes of the display panel upon receipt of the first pair of voltage signals.

The signal generator may further include a protection circuit 25. The protection circuit 25 is located at the at least one pair of output terminals 23 of the signal generating circuit 22, and is configured to protect the signal generating circuit 22 from being damaged by a reverse current. Optionally, the protection circuit 25 is located between the at least one pair of output terminals 23 and at least one pair of adjacent conductive electrodes of the display panel, and is configured to cut off the connection between the output terminals 23 of the signal generator and the conductive electrodes in case of current overload.

Optionally, the protection circuit 25 may be an overcurrent protection chip (PPTC). The PPTC exhibits low resistance in the case of normal current, and has a resistance ranging from a few milliohms (m$\Omega$) to several ohms ($\Omega$); once the current is too large (i.e., an overcurrent fault occurs), the resistance of the PPTC rises sharply, thereby protecting backend devices. The PPTC has excellent recoverable characteristics. After the overcurrent fault is removed, the resistance in the PPTC can be automatically restored to a low resistance, so that the circuit automatically returns to on state.

Optionally, the protection circuit 25 may be disposed on the main board 20 of the signal generator.

In order to increase the efficiency of the test, optionally, the signal generating circuit 22 may include a plurality of pairs of output terminals 23, the signal generating circuit 22 may include a plurality of protection circuits 25, and the plurality of protection circuits 25 are in one-to-one correspondence with the plurality of pairs of output terminals 23. For example, each protection circuit 25 is disposed between one pair of output terminals 23 of the signal generating circuit 22 and corresponding one pair of adjacent conductive electrodes of one display panel.

Optionally, the input terminal 24 and one pair of output terminals 23 of the signal generating circuit 22 may correspond to one display panel to be tested, and one protection circuit 25 is connected between each display panel to be tested and the signal generator. In this way, each of the protection circuits 25 can protect the respective signal generator from overcurrent when testing the respective display panels to be tested at the same time, thereby further improving the safety and reliability of the signal generator.

Optionally, the plurality of input terminals 24 and the plurality of pairs of output terminals 23 of the signal generating circuit 22 may also correspond to different pairs of conductive electrodes of one display panel to be tested, and one protection circuit 15 may be connected between each display panel to be tested and each pair of output terminals 23 of the signal generator. In this way, when testing the plurality of pairs of conductive electrodes of the display panel to be tested at the same time, the respective protection circuits 25 can respectively protect different pairs of output terminals 23 of the signal generator from overcurrent, thereby further improving the safety and reliability of the signal generator.

It could be understood that the above embodiments are merely exemplary embodiments adopted for describing the principle of the present disclosure, but the present disclosure is not limited thereto. Various variations and improvements may be made by those of ordinary skill in the art without departing from the spirit and essence of the present disclo-

The invention claimed is:

1. A signal loading method, comprising:
   simultaneously loading a first pair of voltage signals to at least one pair of separate signal channels on each of a plurality of display panels for a time period, wherein the first pair of voltage signals has a first voltage difference therebetween; and
   determining whether a short circuit occurs in the at least one pair of separate signal channels within the time period, and if it is determined that no short circuit occurs in the at least one pair of separate signal channels within the time period, automatically loading a second pair of voltage signals to the at least one pair of separate signal channels at the end of the time period, wherein the second pair of voltage signals have a second voltage difference therebetween, and the second voltage difference is greater than the first voltage difference.

2. The signal loading method of claim 1, further comprising: once it is determined that a short circuit occurs in the at least one pair of separate signal channels within the time period, stopping loading the first pair of voltage signals to the at least one pair of separate signal channels without loading the second pair of voltage signals to the at least one pair of separate signal channels.

3. The signal loading method of claim 1, wherein the first voltage difference ranges from 8 volts to 10 volts.

4. The signal loading method of claim 1, wherein a length of the time period ranges from 300 nanoseconds to 500 nanoseconds.

5. The signal loading method of claim 1, wherein the second voltage difference ranges from 15 volts to 20 volts.

6. The signal loading method of claim 1, wherein the at least one pair of separate signal channels comprise two separate conductive electrodes.

7. A signal generator, comprising a controller and a signal generating circuit,
   the signal generating circuit comprises at least one pair of output terminals configured to output at least one pair of voltage signals,
   the controller is configured to:
   control the signal generating circuit to output a first pair of voltage signals simultaneously to at least one pair of separate signal channels on each of a plurality of display panels for a time period, wherein a voltage difference between the first pair of voltage signals is a first voltage difference; and
   in the absence of a control instruction within the time period, control the signal generating circuit to automatically output at least one second pair of voltage signals, wherein a voltage difference between the second pair of voltage signals is a second voltage difference, and the second voltage difference is greater than the first voltage difference.

8. The signal generator of claim 7, wherein the controller is further configured to control, upon receipt of the control instruction within the time period, the signal generating circuit to stop outputting the first pair of voltage signals, and not to output the second pair of voltage signals.

9. The signal generator of claim 7, further comprising a protection circuit located at the at least one pair of output terminals of the signal generating circuit and configured to protect the signal generating circuit from being damaged by a reverse current.

10. The signal generator of claim 9, wherein the protection circuit includes an overcurrent protection chip.

11. The signal generator of claim 9, wherein the protection circuit is disposed on a main board of the signal generator.

12. The signal generator of claim 7, wherein the control instruction indicates that a short circuit occurs in the signal channels to which the first pair of voltage signals are loaded within the time period.

13. The signal generator of claim 9, wherein the signal generating circuit comprises a plurality of pairs of output terminals, the signal generator comprises a plurality of protection circuits, and the plurality of protection circuits are in one-to-one correspondence with the plurality of pairs of output terminals.

* * * * *